United States Patent Office 3,664,842
Patented May 23, 1972

---

3,664,842
THERMOGRAPHIC COPY SHEET CONTAINING GUANIDINE COMPOUNDS
Albert W. Leclair, Hudson, N.H., assignor to Nashua Corporation, Nashua, N.H.
No Drawing. Filed Apr. 13, 1970, Ser. No. 28,067
Int. Cl. G03c *1/02*
U.S. Cl. 96—114.1
4 Claims

ABSTRACT OF THE DISCLOSURE

A thermographic copy system utilizing certain U.V. inactivatable reducing agents may be rendered inactivatable by visible light by a dye sensitizer in combination with certain guanidine-based compounds which augment the sensitizing effect.

---

This invention relates to thermographic copying and provides thermographic copy sheets which may be rendered thermographically insensitive.

In thermographic copying, heat energy, generally from an infrared source, is utilized to bring about a color-forming reaction in the copy sheet. In one type, the heat sensitive sheet is brought into face to face contact with a graphic original which carries an image formed of heat absorbing material. When these are exposed to infrared radiation, the image portion of the original is selectively heated to cause the development in the adjacent sheet of a color pattern corresponding to the original. In another type, one of the color forming components of the copy sheet is destroyed or otherwise rendered inactive by exposure to short wavelength radiation in the portions corresponding to the white, non-image areas, thereafter the application of heat or infrared radiation causes color formation in the image areas. This latter type of system has the advantage that the final copy does not remain heat sensitive, as the reactivity of the system has been destroyed by the short wave-length radiation. It is primarily to this type of system that the present invention is directed.

The system of this invention may utilize a single sheet having a coating containing reactive components, one of which is rendered inactive by exposure to short wave-length radiation. Known systems of this type are described by Lawton and Lopez, U.S. Pat. No. 3,076,707 and by Grant, U.S. Pat. No. 3,094,619, which utilize color-forming systems employing diazonium compounds and alpha naphthols respectively. In these systems the copy sheet may be exposed to a short wavelength, e.g. ultraviolet radiation image of the original to be copied, to inactivate all but the unexposed black areas of the copy sheet, and then heated to develop color in the black areas where the components remain reactive. Alternatively, the copy sheet may be initially exposed to infrared radiation while being in contact with the graphic original, to bring about a color-forming reaction in the areas in contact with the black parts of the original, and then subsequently exposed to short wavelength radiation to inactivate the unreacted parts of the sheet.

Two-sheet systems are also known, as exemplified by Benbrook, U.S. Pat. No. 2,789,904 and Workman, U.S. Pat. No. 3,094,417, in which the reactant susceptible of being deactivated by exposure to short wavelength radiation is carried on a sheet separate from the sheet which carries the material with which it enters into a color forming reaction. In utilizing the two-sheet system, the sheet containing the deactivatable component is first exposed to a shortwave radiation image of the original to be copied to cause deactivation of the exposed portions. This sheet is then brought into contact with a sheet containing the other color forming components and heated to bring about a color forming reaction in the unexposed areas. The two-sheet system requires that one of the color forming reactants will transfer when heated from one sheet to the other sufficiently to bring about the color forming reaction.

The present invention is based on the discovery that certain guanidines may accelerate the inactivity by exposure to visible light of certain acetoacetonitriles or naphthols. The acetoacetonitriles and naphthols are employed in the thermographic copying in a number of color-forming reactions including reactions with silver salts. This invention accordingly provides systems in addition to those previously known for providing permanent heat insensitive copies by thermographic means.

In general, the system of this invention utilizes a guanidine, a naphthol or an acetoacetonitrile or a mixture thereof, a dye sensitizer which renders the naphthol or acetoacetonitrile inactive when exposed to visible light and a compound which enters into a color forming reaction with the naphthol or acetoacetonitrile. The compound may be a normally solid organic acid salt of silver reducible by the naphthol or acetoacetonitrile or a compound with which the naphthol or acetoacetonitrile reacts to form a colored complex. Suitable naphthols and derivatives which can be employed in the present invention are disclosed by U.S. Pat. 3,094,417, particularly Col. 3 lines 48 through 61; these are shown generally to be the alpha-naphthols having an electron donor group attached directly to the hydroxy-substituted aromatic ring. Suitable acetoacetonitriles which can be employed in this invention are disclosed in copending application Ser. No. 805,839 filed Mar. 10, 1969 to LeClair these are compounds of the general structure:

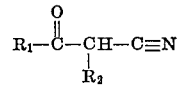

where $R_1$ is an alkyl, alkoxy aromatic or substituted aromatic or aralkyl group and $R_2$ is an aromatic, substituted aromatic or heterocyclic group. The guanidine together with a dye sensitizer is combined with the naphthol or acetoacetonitrile in a suitable binder and applied to a backing sheet of paper or the like. This composition can be applied with the color forming compound, in a single coating, the color forming compound may be applied in a separate coating in face-to-face contact with the guanidine coating on a single backing sheet, or the color forming compound can be applied as a separate coating on a separate sheet. The reactants may be supplied from a solution in a suitable solvent.

The guanidines accelerate the desensitization of the naphthol or acetoacetonitrile upon exposure to actinic radiation, for instance that from a tungsten filament lamp, when a dye sensitizer is introduced in accordance with well known photochemical technology. Dye sensitizers of the erythrosin family have been found to be quite suitable, but others may be used. Typical examples of thermographic copy systems of this invention are described in the following examples.

EXAMPLE I

A sheet sensitive to tungsten radiation may be formed by coating a thin, e.g. glassine paper coated to a coated weight of 1.0 lb. per 3,000 square feet with the composition consisting of:

|   | Grams |
|---|---|
| Methyl ethyl ketone | 45.00 |
| Ethyl cellulose (Ethocel N–10) | 5.00 |
| Erythrosin | 0.01 |
| p-Chlorophenyl-acetoacetonitrile | 0.20 |
| o-Tolyl biguanidine | 0.04 |

The coated paper may be placed in contact with a graphic original and exposed in a 3M Dual Spectrum machine and then placed in contact with a 3M Dual Spectrum white sheet (described in U.S. Pat. 3,094,417 as white paper coated with a continuous thin colorless layer of a ball-milled mixture of 10 parts of silver behenate, 1 part of phthalazorone, 3 parts of poly-t-butyl-methacrylate and 86 parts of acetone, dried and producing a white receptor sheet) and heated in the usual manner. It will become desensitized by exposure to light of wave length of about 4,000 to 7,000 angstroms in about ½ the time needed to desensitize a coating omitting the o-tolyl biguanidine. The same accelerating effect is observed when 4-methoxyl-1-naphthol is substituted for p-chlorophenyl-acetoacetonitrile.

Guanidines which have been found useful are represented by the Formula I.

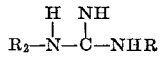

wherein $R_1$ can be hydrogen, phenyl or o-tolyl, $R_2$ can be phenyl, o-tolyl and when $R_1$ is hydrogen, $R_2$ is guanyl. Particularly suitable compounds are o-tolyl biguanidine, diphenyl guanidine and di-o-tolyl guanidine.

Dye sensitizers other than erythrosin 2',4',5',7'-tetra-iodofluoroscein) that may be used include Rose Bengal, Safra-nin-o, Methylene blue, Eosin-Y and Seto Flavin-T, all of which are well known as being effective to shift the spectral response of a photosensitive material into the visual range.

What is claimed is:

1. In a copy sheet product which is useful for thermographically imaging a copy sheet containing an organic silver salt and which comprises an alpha naphthol or an acetoacetonitrile reducing agent susceptible to inactivation upon exposure to ultraviolet radiation and a dye sensitizer effect to render the reducing agent susceptible to inactivation upon exposure to visible light, the improvement comprising the presence in said sheet of a guanidine compound of the formula

wherein $R_1$ is hydrogen, phenyl or o-tolyl; $R_2$ is phenyl, o-tolyl or guanyl; and when $R_1$ is hydrogen, $R_2$ is guanyl, said guanidine compound being present in an amount effective to accelerate the inactivation of the reducing agent.

2. A copy sheet as defined by claim 1 wherein said material reactive with a silver salt is p-chlorophenylacetoacetonitrile.

3. A copy sheet as defined by claim 1 wherein said material reactive with a silver salt is 4-methoxy-1-naphthol.

4. A copy sheet as defined by claim 1 wherein the guanidine is o-tolyl biguanidine.

References Cited

UNITED STATES PATENTS

| | | | |
|---|---|---|---|
| 3,094,417 | 6/1963 | Workman | 96—28 |
| 3,149,990 | 9/1964 | Coles | 250—65.1 |
| 3,224,878 | 12/1965 | Klimkowski | 250—65.1 |
| 3,429,706 | 2/1969 | Shepard | 96—64 |
| 3,473,945 | 10/1969 | Futaki | 117—36.8 |

J. TRAVIS BROWN, Primary Examiner

J. R. HIGHTOWER, Assistant Examiner

U.S. Cl. X.R.

117—36.7, 36.8